United States Patent
Nishiyama

(10) Patent No.: US 10,518,784 B2
(45) Date of Patent: Dec. 31, 2019

(54) INFORMATION PROCESSING APPARATUS, INFORMATION PROCESSING METHOD, AND COMPUTER PROGRAM PRODUCT

(71) Applicant: KABUSHIKI KAISHA TOSHIBA, Tokyo (JP)

(72) Inventor: Manabu Nishiyama, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/441,752

(22) Filed: Feb. 24, 2017

(65) Prior Publication Data

US 2017/0341661 A1 Nov. 30, 2017

(30) Foreign Application Priority Data

May 26, 2016 (JP) ................................ 2016-105532

(51) Int. Cl.
*B60W 50/00* (2006.01)
*B60W 50/14* (2012.01)
*G05D 1/00* (2006.01)

(52) U.S. Cl.
CPC ........ *B60W 50/0098* (2013.01); *B60W 50/14* (2013.01); *G05D 1/0061* (2013.01); *B60W 2050/007* (2013.01); *B60W 2510/30* (2013.01); *B60W 2520/10* (2013.01); *B60W 2540/18* (2013.01); *B60W 2540/20* (2013.01); *B60W 2550/12* (2013.01); *B60W 2550/14* (2013.01); *B60W 2550/308* (2013.01); *B60W 2550/40* (2013.01)

(58) Field of Classification Search
None
See application file for complete search history.

(56) References Cited

U.S. PATENT DOCUMENTS

| | | | |
|---|---|---|---|
| 8,818,608 B2 | 8/2014 | Cullinane et al. |
| 8,825,258 B2 | 9/2014 | Cullinane et al. |
| 9,075,413 B2 | 7/2015 | Cullinane et al. |
| 9,352,752 B2 | 5/2016 | Cullinane et al. |
| 9,511,779 B2 | 12/2016 | Cullinane et al. |

(Continued)

FOREIGN PATENT DOCUMENTS

| | | |
|---|---|---|
| JP | 2001-199295 | 7/2001 |
| JP | 2014-106854 | 6/2014 |

(Continued)

*Primary Examiner* — Richard M Camby
(74) *Attorney, Agent, or Firm* — Nixon & Vanderhye, P.C.

(57) ABSTRACT

According to an embodiment, an information processing apparatus includes a memory having computer executable components stored therein; and processing circuitry communicatively coupled to the memory, the processing circuitry configured to: acquire vehicle related information serving as information relating to a vehicle switchable between manual driving and automatic driving, the vehicle related information indicating information used for determining whether switching to the automatic driving is possible; determine whether each of one or more conditions to switch from the manual driving to the automatic driving is satisfied, based on the vehicle related information; and output information corresponding to an unsatisfied condition indicating a condition determined to be unsatisfied at the determining.

18 Claims, 5 Drawing Sheets

(56) References Cited

U.S. PATENT DOCUMENTS

| | | | |
|---|---|---|---|
| 9,663,117 | B2 | 5/2017 | Cullinane et al. |
| 9,821,818 | B2 | 11/2017 | Cullinane et al. |
| 10,000,216 | B2 | 6/2018 | Cullinane et al. |
| 10,300,926 | B2 | 5/2019 | Cullinane et al. |
| 2014/0156133 | A1* | 6/2014 | Cullinane ............ B60W 30/00 701/23 |
| 2014/0156134 | A1 | 6/2014 | Cullinane et al. |
| 2014/0330478 | A1 | 11/2014 | Cullinane et al. |
| 2015/0284009 | A1 | 10/2015 | Cullinane et al. |
| 2015/0353088 | A1 | 12/2015 | Ishikawa |
| 2016/0200326 | A1 | 7/2016 | Cullinane et al. |
| 2017/0043788 | A1 | 2/2017 | Cullinane et al. |
| 2017/0253253 | A1 | 9/2017 | Cullinane et al. |
| 2017/0261983 | A1* | 9/2017 | Abe ..................... G05D 1/0061 |
| 2018/0043904 | A1 | 2/2018 | Cullinane et al. |
| 2018/0334173 | A1 | 11/2018 | Cullinane et al. |

FOREIGN PATENT DOCUMENTS

| | | |
|---|---|---|
| JP | 2015-162175 | 9/2015 |
| JP | 2015-230573 | 12/2015 |
| JP | 2016-504232 | 2/2016 |

\* cited by examiner

FIG.2

| No | DETERMINATION TARGET | DETERMINATION CONDITION |
|---|---|---|
| 1 | VEHICLE SPEED OF ITS OWN VEHICLE | EQUAL TO OR HIGHER THAN 60 km/h AND EQUAL TO OR LESS THAN 80 km/h |
| 2 | INTER-VEHICULAR DISTANCE FROM VEHICLE AHEAD | DISTANT BY 80 m OR MORE |
| 3 | POSITION IN LANE | TRAVELING STRAIGHT NEAR CENTER OF LANE |
| 4 | WEATHER | SUNNY OR CLOUDY |
| 5 | TIME | TIME PERIOD IN DAYTIME |

FIG.3

| No | DETERMINATION TARGET | DETERMINATION CONDITION | |
|---|---|---|---|
| 1 | VEHICLE SPEED OF ITS OWN VEHICLE | EQUAL TO OR LESS THAN 50 km/h | |
| 2 | DIFFERENCE IN SPEED FROM VEHICLE AHEAD | DIFFERENCE OF 10 km/h OR LESS | |
| 3 | WEATHER | SUNNY OR CLOUDY | |
| 4 | TIME | TIME PERIOD IN DAYTIME | ← FIRST CONDITION |
| | ILLUMINANCE | ILLUMINANCE OF CERTAIN VALUE OR MORE | ← SECOND CONDITION |

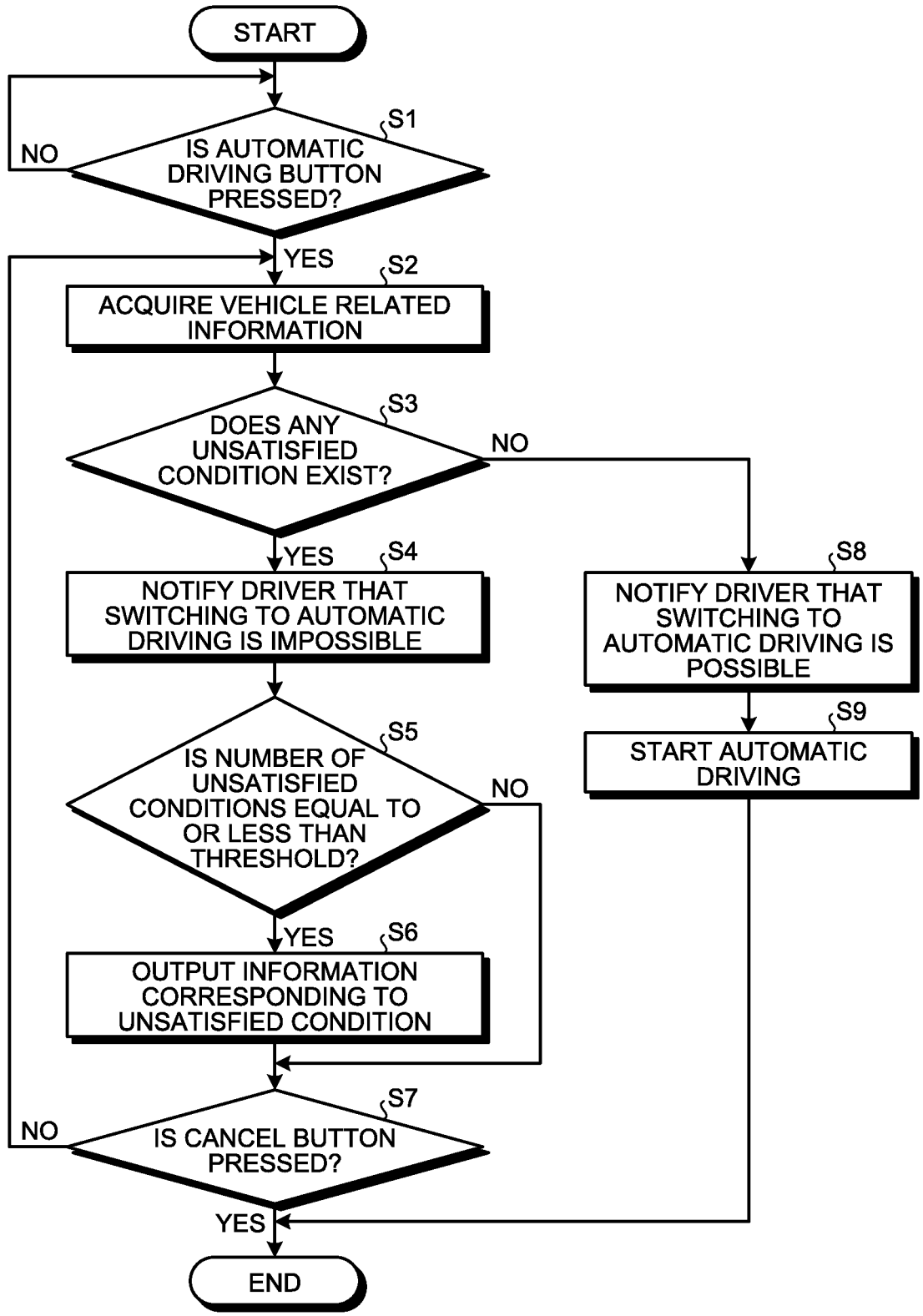

FIG.5

| No | DETERMINATION TARGET | DETERMINATION CONDITION | CONTROL FLAG |
|---|---|---|---|
| 1 | VEHICLE SPEED OF ITS OWN VEHICLE | EQUAL TO OR HIGHER THAN 60 km/h AND EQUAL TO OR LESS THAN 80 km/h | 1 |
| 2 | INTER-VEHICULAR DISTANCE FROM VEHICLE AHEAD | DISTANT BY 80 m OR MORE | 1 |
| 3 | POSITION IN LANE | TRAVELING STRAIGHT NEAR CENTER OF LANE | 1 |
| 4 | WEATHER | SUNNY OR CLOUDY | 0 |
| 5 | TIME | TIME PERIOD IN DAYTIME | 0 | ic
INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2016-105532, filed on May 26, 2016; the entire contents of which are incorporated herein by reference.

FIELD

Embodiments described herein relate generally to an information processing apparatus, an information processing method, and a computer program product.

BACKGROUND

In an automatic driving vehicle (autonomous driving vehicle) in which the vehicle itself judges the surrounding circumstances and performs driving instead of the driver, switching from manual driving to automatic driving is generally supposed. This switching is performed to achieve flexible operation, for example, automatic driving is performed only in a specific section such as an expressway and a main road, and manual driving is performed in other situation requiring complicated judgment.

A technique is known as a mechanism for determining whether switching from manual driving to automatic driving is possible. The technique is a technique of automatically performing determination based on various driving situations. For example, in the technique, it is determined whether automatic driving is possible based on a traveling state of the vehicle, surrounding circumstances of the vehicle, and the state of the driver, and the driving is not switched to automatic driving when conditions for performing automatic driving are not satisfied.

However, because conventional art only enables determination as to whether switching to automatic driving is possible based on various driving situations, the conventional art has the problem that the driver cannot understand the reason why switching to automatic driving is impossible when switching is impossible, and the driver cannot use automatic driving even in a situation in which automatic operation can be started with simple correction (such as reducing the speed).

BRIEF DESCRIPTION OF THE DRAWINGS

FIG. 2 is a diagram illustrating an example of condition information of the first embodiment;

FIG. 3 is a diagram illustrating an example of the condition information of the first embodiment;

FIG. 4 is a diagram illustrating an operation example of the information processing apparatus according to the first embodiment;

FIG. 5 is a diagram illustrating an example of condition information of a second embodiment.

DETAILED DESCRIPTION

According to an embodiment, an information processing apparatus includes a memory having computer executable components stored therein; and processing circuitry communicatively coupled to the memory, the processing circuitry configured to: acquire vehicle related information serving as information relating to a vehicle switchable between manual driving and automatic driving, the vehicle related information indicating information used for determining whether switching to the automatic driving is possible; determine whether each of one or more conditions to switch from the manual driving to the automatic driving is satisfied, based on the vehicle related information; and output information corresponding to an unsatisfied condition indicating a condition determined to be unsatisfied at the determining.

Embodiments of an information processing apparatus, an information processing method, and a computer program product according to embodiments will be explained hereinafter with reference to drawings.

First Embodiment

Figure 1:
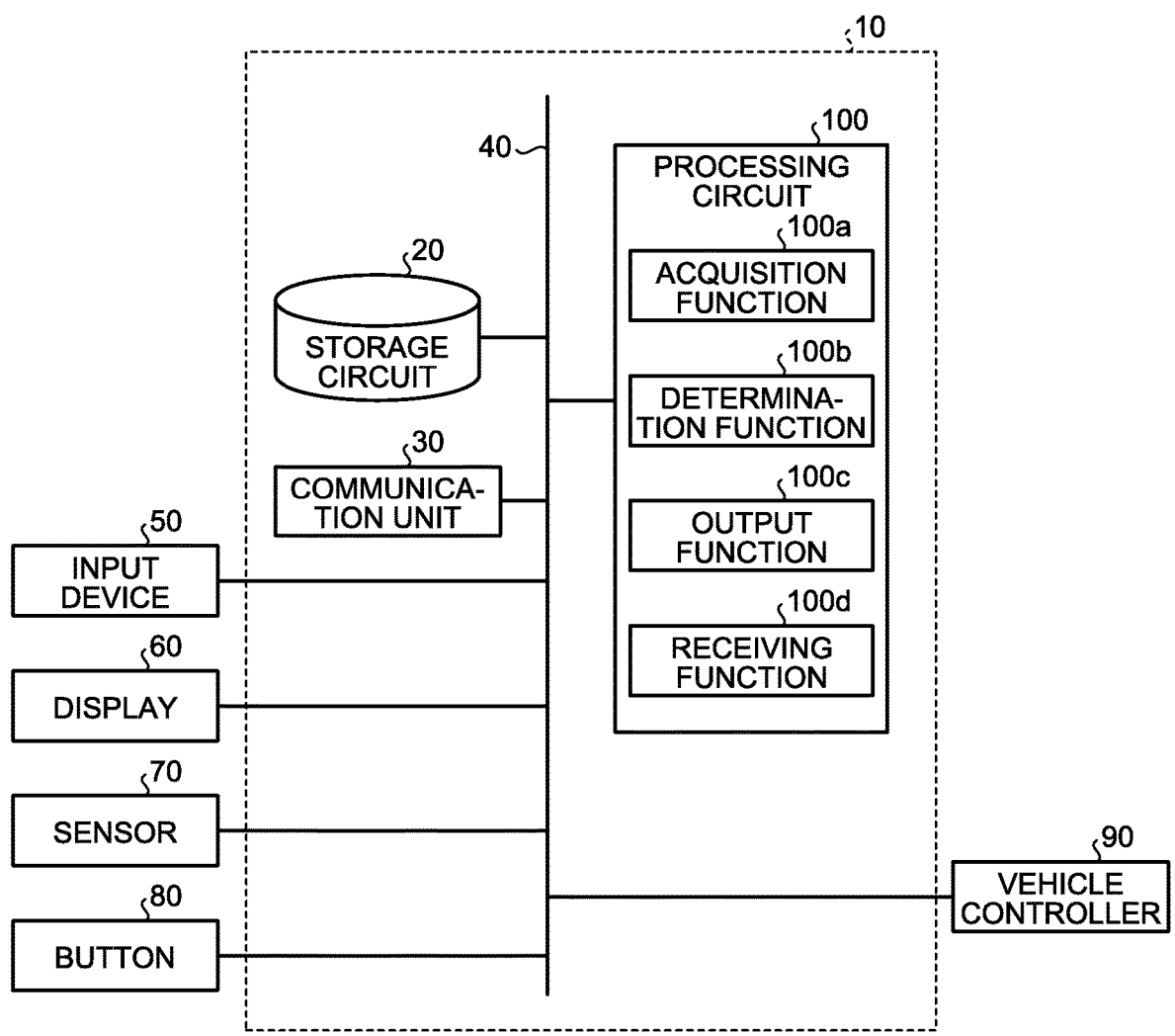
FIG. 1 is a diagram illustrating configuration of an information processing apparatus according to a first embodiment.

FIG. 1 is a diagram illustrating an example of configuration of an information processing apparatus 10 according to the present embodiment. The information processing apparatus 10 is, for example, a dedicated or general-purpose computer, and mounted to a vehicle capable of switching between manual driving and automatic driving, but is not limited thereto. For example, the embodiment may have a form in which processing by the information processing apparatus 10 is performed on the cloud. The information processing apparatus 10 is used for transmitting information relating to switching to the driver, when switched from manual driving to automatic driving is performed. When switching from manual driving to automatic driving is impossible, the information processing apparatus 10 according to the present embodiment extracts a condition that is not satisfied at present (hereinafter also referred to as "unsatisfied condition" in the following explanation), and outputs information (described in detail later) corresponding to the unsatisfied condition to the driver. This structure enables the user to recognize the reason why switching to automatic driving is impossible, and enables the user to correct a driving operation to satisfy the unsatisfied condition (to solve the cause that prevents switching to automatic driving). This structure enables use of automatic driving in more situations.

As illustrated in FIG. 1, the information processing apparatus 10 includes a processing circuit 100, a storage circuit 20, a communication unit 30, and a bus 40 connecting the components.

The processing circuit 100 includes an acquisition function 100a, a determination function 100b, an output function 100c, and a receiving function 100d. Specific details of these processing functions will be described later. The example of FIG. 1 mainly illustrates functions relating to the present embodiment, but the functions of the processing circuit 100 are not limited thereto.

The processing functions performed in the information processing apparatus 10 are stored in the storage circuit 20 in the form of programs executable by a computer. The processing circuit 100 is a processor reading and executing the programs from the storage circuit 20, to achieve the functions corresponding to the respective programs. The processing circuit 100 in a state of reading the respective programs has the respective functions illustrated in the processing circuit 100 of FIG. 1.

FIG. 1 illustrates that the single processing circuit 100 achieves the processing functions performed with the acquisition function 100*a*, the determination function 100*b*, the output function 100*c*, and the receiving function 100*d*, but a plurality of independent processors may be combined to form the processing circuit 100, and the functions may be achieved by executing the programs by the respective processors. The processing functions may be formed as programs, and one processing circuit may execute the programs. As another example, a specific function may be implemented in a dedicated independent program execution circuit.

The acquisition function 100*a* included in the processing circuit 100 is an example of "acquirer", and the determination function 100*b* is an example of "determiner", and the output function 100*c* is an example of "output unit".

The term "processor" used in the explanation described above means, for example, a central processing unit (CPU), a graphical processing unit (GPU), or an application specific integrated circuit (ASIC), a programmable logic device (such as a simple programmable logic device: SPLD), a complex programmable logic device (CPLD), and a circuit of a field programmable gate array (FPGA). The processor achieves the function by reading and executing programs stored in the storage circuit 20. Instead of storing programs in the storage circuit 20, programs may be directly incorporated in a circuit of the processor. In this case, the processor achieves the functions by reading and executing the programs incorporated in the circuit.

The storage circuit 20 stores data and the like accompanying the processing functions executed by the processing circuit 100, if necessary. The storage circuit 20 of the present embodiment stores the programs, and condition information (described later) indicating one or more conditions for switching manual driving to automatic driving. For example, the storage circuit 20 is a semiconductor memory device such as a random access memory (RAM) and a flash memory, a hard disk, or an optical disk. The storage circuit 20 may be replaced by a storage device outside the information processing apparatus 10. The storage circuit 20 may be a storage medium storing or temporarily storing programs transmitted through and downloaded from a local area network (LAN) or the Internet. The storage medium is not limited to one storage medium, but the storage medium in the embodiment also includes the case where the processing in the embodiment described above is executed from a plurality of media, and the medium may have any structure.

The communication unit 30 is an interface performing information input and output from and to an external device connected in a wired or wireless manner. The communication unit 30 may be connected to a network to perform communication.

An input device 50 receives various instructions and information inputs from an operator (driver in this case). The input device 50 is, for example, a pointing device such as a mouse and a trackball, or an input device such as a keyboard.

A display 60 displays various types of information relating to the vehicle. The display 60 is a display device such as a liquid crystal display.

The sensor 70 is an external recognition sensor to achieve automatic driving. The sensor 70 includes a sonar detecting an object with sound waves, a stereo camera to acquire information in the depth direction around the vehicle, a position specification camera to accurately specify the traveling place from the surrounding circumstances, a millimeter wave radar or a laser sensor to measure a distance to an object existing around the vehicle, and a position sensor acquiring the position of the vehicle, but is not limited thereto.

A button 80 includes an automatic driving start button to instruct the vehicle to switch to automatic driving, and a cancel button to stop (cancel) switching to automatic driving. A vehicle controller 90 determines the surrounding circumstances based on the information acquired from the sensor 70, and controls the acceleration amount, the brake amount, and the steering angle, to automatically drive the vehicle. Specifically, the vehicle controller 90 controls the vehicle to maintain the current traveling lane, and maintain a distance from the vehicle ahead at a predetermined distance or more.

The input device 50, the display 60, the sensor 70, the button 80, and the vehicle controller 90 of the present embodiment are connected with the information processing apparatus 10 in a wired or wireless manner.

The following is explanation of the functions of the processing circuit 100. The acquisition function 100*a* acquires vehicle related information serving as information relating to the vehicle, and indicating information used for determining whether switching to automatic driving is possible. The vehicle related information includes sensor information based on a sensing result obtained by the sensor 70, information indicating the traveling state of the vehicle, information indicating the state of the driver, positional information of the vehicle, map information around the vehicle, and surrounding environment information obtained from the exterior of the vehicle. One or more pieces of information among the types of information are acquired.

For example, in the case of acquiring sensor information, the acquisition function 100*a* acquires an analysis result of a sensing result obtained by the sensor 70 that is, for example, a laser sensor, a camera, or a millimeter wave laser, which is executed in a safety support device for emergency brake and lane keeping support, to acquire information such as a position, speed, and type of an object (such as a vehicle, a pedestrian, and other obstacles) around the vehicle, as sensor information. As another example, the acquisition function 100*a* may directly acquire the sensing result described above, and perform analysis processing thereof. In this case, the acquisition function 100*a* can determine a position, speed, and type of an object existing around the vehicle, using a generally known technique such as mapping based on laser sensor information, pattern recognition and three-dimensional reconstruction based on an image, and stereoscopy. As another example, the acquisition function 100*a* is also capable of estimating the current illuminance, the snow accumulation on the road, and the wet degree of the road, by analyzing an image acquired by imaging with a camera or the like.

The information indicating the traveling state of the vehicle can be acquired by acquisition of information transmitted through an in-vehicle network, or analysis of information of an encoder mounted to the wheels or the steering device, and analysis of an image acquired by imaging with a camera. The information indicating the traveling state of the vehicle includes information such as the vehicle speed, the steering angle, the operation amounts of the accelerator and the brake, and the position of the vehicle in the traveling lane. The information indicating the traveling state of the vehicle also includes information (operation information) indicating operations of the turn signal and the wipers. The acquisition function 100*a* may acquire operation information transmitted through the in-vehicle network, or may acquire operation information by directly sensing these operations with the sensor 70 and acquiring a sensing result thereof. Based on the operation information, estimation is possible with respect to a lane change, intention to turn right or left, and the weather.

The information indicating the state of the driver can be acquired by acquiring an analysis result of doze detection and inattentive driving detection using an in-vehicle camera, and the steering handle holding state. Using them enables estimation of the driver's attention concentration state to driving. The positional information of the vehicle can be acquired by acquiring positional information acquired with a GPS receiver mounted on the vehicle. The map information around the vehicle can be acquired from a vehicle navigation system mounted on the vehicle. Using these pieces of information enables determination as to the place where the vehicle is traveling at present, and whether the traveling place is a section in which automatic driving is possible (such as an expressway and a main road). In addition, when information of the number of lanes, the lane width, and the crossing of each spot can be acquired as map information for automatic driving, the information can be used as one piece of environment information around the vehicle.

Examples of the surrounding environment information acquired from the exterior of the vehicle include information relating to the vehicle speed and the steering angle of another vehicle other than the vehicle, the position and size information of an obstacle found by another vehicle, and information relating to a signal and a traffic sign. The surrounding environment information can be acquired by using a mechanism of, for example, a vehicle-vehicle communication and a road-vehicle communication. Examples of the surrounding environment information acquired from the exterior of the vehicle also include information indicating the current, past, and future weather, and information indicating traffic congestion, and can be acquired by data communication with the exterior. As described above, as the vehicle related information, information indicating various states can be acquired from the exterior, such as the state of the vehicle, the state of an object (such as a vehicle, a pedestrian, and an obstacle) around the vehicle, the state of the surrounding environment, and the state of the driver. The vehicle related information is satisfactory as long as it corresponds to the condition for switching from manual driving to automatic driving, and all the pieces of information described above are not necessarily acquired.

Explanation of the functions of the processing circuit 100 will be continued hereinafter. The determination function 100b determines one or more conditions for switching from manual driving to automatic driving, based on the vehicle related information acquired by the acquisition function 100a. More specifically, the determination function 100b checks the vehicle related information against condition information indicating one or more conditions for switching from manual driving to automatic driving, and determines whether the condition is satisfied, for each of the conditions indicated with the condition information. In this example, one or more conditions are five conditions that the vehicle speed falls within a predetermined range, the inter-vehicular distance is equal to or less than a threshold, the vehicle is traveling in a region corresponding to a central portion of the road, the time is in a time period in which automatic driving is possible, and the weather is weather in which automatic driving is possible, but are not limited thereto. For example, as the conditions, different conditions may be adopted, such as conditions that the turn signal is not in operation, the steering angle of the steering wheel falls within a fixed threshold, the surface of the traveling road is not covered with a material other than asphalt, the wipers are not in operation, and the traveling position is in a section in which automatic driving is possible in the map information. In short, the conditions described above are satisfactory as long as the conditions include at least one of the conditions that the vehicle speed falls within a predetermined range, the inter-vehicular distance is equal to or less than a threshold, the automatic driving vehicle is traveling in a region corresponding to a central portion of the road, the time is in a time period in which automatic driving is possible, the weather is weather in which automatic driving is possible, the turn signal is not in operation, the steering angle of the steering wheel falls within a fixed threshold, the surface of the traveling road is not covered with a material other than asphalt, the wipers are not in operation, and the traveling position is in a section in which automatic driving is possible in the map information.

FIG. 2 illustrates an example of the condition information. The condition information of FIG. 2 indicates five conditions, and each of the conditions is formed of a pair of information indicating a determination target and information indicating a determination condition. The first condition (condition of No. 1) is explained with attention herein, but the second to fifth conditions can be considered in the same manner. The first condition is formed of a pair of information indicating "vehicle speed of the vehicle" as the determination target, and information indicating "equal to or higher than 60 km/h and equal to or less than 80 km/h" as the determination condition. Specifically, the first condition indicates that "the vehicle speed of the vehicle is equal to or higher than 60 km/h and equal to or less than 80 km/h (an example of the predetermined range)". The predetermined range may be a range in which automatic driving is possible, and may be set to various ranges in accordance with design conditions and the like.

The determination function 100b checks the condition information described above with the vehicle related information acquired by the acquisition function 100a, and determines whether the condition is satisfied, for each of the conditions indicated with the condition information. The determination function 100b determines that switching to automatic driving is possible when all the conditions indicated with the condition information are satisfied, and determines that switching to automatic driving is impossible when any of the conditions is unsatisfied.

As another example, as illustrated in FIG. 3, the conditions indicated with the condition information may include alternative conditions. In the example of FIG. 3, the fourth condition serves as the alternative conditions, and includes a first condition indicating that "the time is in a time period in the daytime" and a second condition indicating that "the illuminance has a fixed value or more". The determination function 100b can determine that the fourth condition is satisfied, when one of the first condition and the second condition is satisfied, even when the other condition is not satisfied.

With reference to FIG. 1 again, explanation of functions of the processing circuit 100 is continued hereinafter. The output function 100c outputs information corresponding to an unsatisfied condition indicating a condition determined by the determination function 100b as unsatisfied condition. The output function 100c can output information indicating which condition is not satisfied, as information corresponding to an unsatisfied condition. For example, when the first condition is an unsatisfied condition in the conditions indicated with the condition information of FIG. 2, the output function 100c can output information (message) indicating that the condition relating to the vehicle speed is not satisfied, such as a message "the vehicle speed fails to satisfy the condition".

As another example, for example, the output function 100c can output information indicating the cause of the unsatisfied condition, as information corresponding to the unsatisfied condition. For example, among the conditions indicated with the condition information of FIG. 2, when the current vehicle speed is 90 km/h with respect to the first condition serving as an unsatisfied condition, the output function 100c can output information (such as a message) indicating the cause of the unsatisfied condition, such as a message "the vehicle speed exceeds the range". From another viewpoint, the output function 100c can be regarded as outputting information indicating the current state for the unsatisfied condition, as information corresponding to the unsatisfied condition.

In the present embodiment, the output function 100c outputs information corresponding to the unsatisfied condition, when the number of unsatisfied conditions is equal to or less than a threshold. For example, when all the conditions indicated with the condition information of FIG. 2 are unsatisfied conditions, it is difficult to determine whether such output information is useful for the driver, even when information corresponding to the unsatisfied condition is output for each of all the unsatisfied conditions. For this reason, when the number of unsatisfied conditions exceeds the threshold, the output function 100c does not output information corresponding to the unsatisfied conditions.

The output form of information corresponding to the unsatisfied condition as described above may be any form. The output form may be a form in which information corresponding to the unsatisfied condition is displayed as image information on the display 60, or may be a form in which information corresponding to the unsatisfied information is output as sound information from speakers or the like.

The receiving function 100d receives a driver's operation. For example, the receiving function 100d receives a driver's operation of pressing down the button 80.

FIG. 4 is a flowchart illustrating an operation example of the information processing apparatus 10 (processing circuit 100) according to the present embodiment. As illustrated in FIG. 4, first, the receiving function 100d determines whether pressing down of the automatic driving start button is received (Step S1). When a result of Step S1 is affirmative (Yes at Step S1), the acquisition function 100a acquires the vehicle related information described above (Step S2).

Thereafter, the determination function 100b checks the vehicle related information acquired at Step S2 against the condition information described above, and determines whether any unsatisfied condition exists (Step S3). The following is explanation of the case where a result of Step S3 is affirmative (Yes at Step S3).

In this case, the output function 100c notifies the driver that switching to automatic driving is impossible (Step S4). The form of notification may be any form, for example, a form in which information indicating that switching to automatic driving is impossible is displayed on the display 60, a form of outputting the information as sound, or a form of turning on a predetermined lamp (lamp corresponding to information that switching to automatic driving is impossible). Thereafter, the output function 100c determines whether the number of unsatisfied conditions is equal to or less than the threshold (Step S5). When a result of Step S5 is affirmative (Yes at Step S5), the output function 100c outputs information corresponding to the unsatisfied condition (Step S6). Thereafter, the receiving function 100d determines whether pressing down of a cancel button is received (Step S7). When a result of Step S7 is affirmative (Yes at Step S7), the process is ended. By contrast, when a result of Step S7 is negative (No at Step S7), the processing of Step S2 and the subsequent steps described above is repeated.

The following is explanation of the case where the result of Step S3 described above is negative (No at Step S3). In this case, the output function 100c notifies the driver that switching to automatic driving is possible (Step S8). The form of notification may be any form, for example, a form in which information indicating that switching to automatic driving is possible is displayed on the display 60, a form of outputting the information as sound, or a form of turning on a predetermined lamp (lamp corresponding to information that switching to automatic driving is possible). Thereafter, the output function 100c requests the vehicle controller 90 to switch to automatic driving. The vehicle controller 90 that has received the request executes control to perform automatic driving (Step S9).

As explained above, the information processing apparatus 10 according to the present embodiment determines one or more conditions for switching from manual driving to automatic driving, based on vehicle related information relating to the vehicle to which the information processing apparatus 10 is mounted, and indicating information used for determining whether switching to automatic driving is possible. When any unsatisfied condition indicating a condition determined as unsatisfied condition exists, the information processing apparatus 10 outputs information corresponding to the unsatisfied condition. As the information corresponding to the unsatisfied condition, as described above, because the information processing apparatus 10 is capable of outputting information indicating which condition is not satisfied, and information indicating the cause of the unsatisfied condition, the driver is enabled to recognize the reason why switching to automatic driving is impossible. When the unsatisfied condition is a condition that can be corrected by a driver's operation, the driver is enabled to correct an operation to satisfy the unsatisfied condition. This structure enables use of automatic driving in more situations.

Second Embodiment

The following is explanation of a second embodiment. Explanation of parts of the second embodiment similar to those of the first embodiment described above is properly omitted. The basic structure of the present embodiment is the same as that of the first embodiment described above.

The output function 100c according to the present embodiment outputs information prompting the driver to perform an operation to satisfy an unsatisfied condition, as the information corresponding to the unsatisfied condition, when the unsatisfied condition is a condition that can be corrected by a driver's operation. For example, as illustrated in FIG. 5, the condition information may be information associated with a control flag indicating whether the condition is correctable by a driver's operation, for each of one or more conditions. In the example of FIG. 5, a control flag set to "1" indicates that the condition is correctable by a driver's operation, and a control flag set to "0" indicates that the condition is uncorrectable by a driver's operation, but the structure is not limited thereto. The output function 100c is enabled to determine whether the unsatisfied condition is a condition correctable by a driver's operation, with reference to the control flag associated with the unsatisfied condition.

For example, among the conditions indicated with the condition information of FIG. 5, when the current vehicle speed is 90 km/h with respect to the first condition serving as an unsatisfied condition, the output function 100c can output a message such as "drop the speed to start automatic driving", as information promoting the driver to perform an operation to satisfy the unsatisfied condition.

In addition, the output function 100c according to the present embodiment outputs information corresponding to an unsatisfied condition that is uncorrectable by a driver's operation, with priority over information corresponding to an unsatisfied condition correctable by a driver's operation. In addition, the output function 100c according to the present embodiment outputs information promoting the driver to satisfy the unsatisfied condition, as information corresponding to the unsatisfied condition, when the number of unsatisfied conditions is equal to or less than a threshold and all the unsatisfied conditions are conditions correctable by driver's operations.

Figure 6:
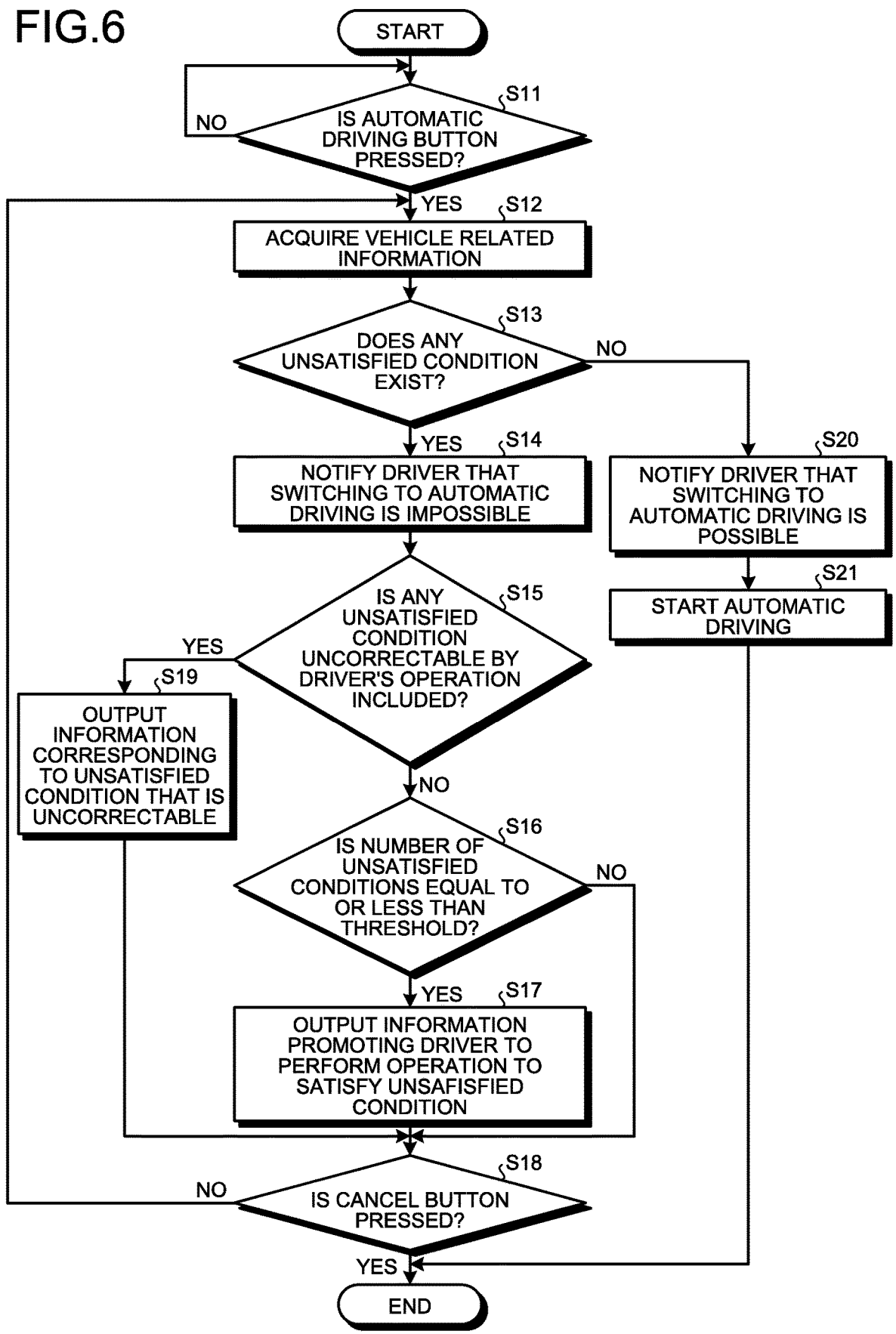
FIG. 6 is a diagram illustrating an operation example of the information processing apparatus according to the second embodiment.

FIG. 6 is a flowchart illustrating an operation example of the information processing apparatus 10 (processing circuit 100) according to the present embodiment. The processing details of Step S11 to Step S14 are the same as the processing details of Step S1 to Step S4 of FIG. 4. In addition, the processing details of Step S20 to Step S21 are the same as the processing details of Step S8 to Step S9 of FIG. 4.

At Step S15 after Step S14, the output function 100c determines whether the unsatisfied conditions determined at Step S13 include any unsatisfied condition that is uncorrectable by a driver's operation (Step S15).

When a result of Step S15 is negative (No at Step S15), the output function 100c determines whether the number of unsatisfied conditions is equal to or less than the threshold (Step S16). When a result of Step S16 is negative (No at Step S16), the process goes to Step S18 described later. When a result of Step S16 is affirmative (Yes at Step S16), the output function 100c outputs information promoting the driver to perform an operation to satisfy the unsatisfied condition (Step S17). Thereafter, the receiving function 100d determines whether pressing down of the cancel button is received (Step S18). When a result of Step S18 is affirmative (Yes at Step S18), the process is ended. By contrast, when a result of Step S18 is negative (No at Step S18), the processing of Step S12 and the subsequent steps is repeated.

In addition, when a result of Step S15 described above is affirmative (Yes at Step S15), the output function 100c outputs information corresponding to the unsatisfied condition that is uncorrectable (Step S19). Specifically, the output function 100c outputs information corresponding to an unsatisfied condition that is uncorrectable by a driver's operation, with priority over information corresponding to an unsatisfied condition correctable by a driver's operation. The information corresponding to the unsatisfied condition in this case may be, for example, information indicating the cause of the unsatisfied condition. For example, when the fourth condition in the conditions indicated with the condition information of FIG. 5 is an unsatisfied condition, the output function 100c is capable of outputting information (such as a message) indicating the cause of the unsatisfied condition, such as a message "automatic driving is impossible because of rain". The structure is not limited thereto, but, for example, the structure may have a form of outputting information indicating which condition is not satisfied, as the information corresponding to the unsatisfied condition in this case. For example, the output function 100c is capable of outputting information (such as a message) indicating that the condition relating to the weather is not satisfied, such as a message "the weather does not satisfy the condition". In addition, for example, the output function 100c is capable of ending the processing (performing only notification of Step S14) without any processing, without outputting information corresponding to the unsatisfied condition that is uncorrectable.

In addition, the programs executed by the information processing apparatus 10 according to each of the embodiments described above may be stored on a computer connected to a network such as the Internet, and may be provided by being downloaded through the network. The programs executed by the information processing apparatus 10 according to each of the embodiments described above may be provided or distributed through a network such as the Internet. As another example, the programs executed by the information processing apparatus 10 according to each of the embodiments described above may be incorporated in advance in a nonvolatile storage medium such as a ROM, to be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory having computer executable components stored therein; and processing circuitry communicatively coupled to the memory, the processing circuitry configured to:
acquire vehicle related information serving as information relating to a vehicle switchable between manual driving and automatic driving, the vehicle related information indicating information used for determining whether switching to the automatic driving is possible;
determine whether each of one or more conditions to switch from the manual driving to the automatic driving is satisfied, based on the vehicle related information;
count a number of one or more unsatisfied conditions; and
output information corresponding to the one or more unsatisfied conditions each indicating a condition determined to be unsatisfied at the determining, when the counted number of the one or more unsatisfied conditions is equal to or less than a first threshold.

2. The apparatus according to claim 1, wherein the outputting outputs information indicating the one or more unsatisfied conditions, as the information corresponding to the one or more unsatisfied conditions.

3. The apparatus according to claim 1, wherein the outputting outputs information indicating cause of the one or more unsatisfied conditions, as the information corresponding to the one or more unsatisfied conditions.

4. The apparatus according to claim 1, wherein the outputting outputs information for promoting a driver to correct one or more driver correctable conditions included in the one or more unsatisfied conditions, as the information corresponding to the one or more unsatisfied conditions.

5. The apparatus according to claim 4, wherein the outputting outputs information corresponding to an unsatisfied condition uncorrectable by the driver's operation, with priority over information corresponding to the driver correctable conditions.

6. The apparatus according to claim 4, wherein the outputting outputs the information for promoting the driver to correct the driver correctable conditions, as the information corresponding to the one or more unsatisfied conditions, when a number of unsatisfied conditions is equal to or less than a second threshold and all the unsatisfied conditions are driver correctable conditions.

7. The apparatus according to claim 1, wherein the one or more conditions includes at least one of conditions that a vehicle speed falls within a predetermined range, an inter-vehicular distance is equal to or less than a threshold, the vehicle is traveling in a region corresponding to a central portion of a road, time is in a time period in which automatic driving is possible, weather is weather in which automatic driving is possible, a turn signal is not in operation, a steering angle of a steering wheel falls within a fixed threshold, a surface of a traveling road is not covered with a material other than asphalt, wipers are not in operation, or a traveling position is in a section in which automatic driving is possible in map information.

8. The apparatus according to claim 1, wherein the vehicle related information includes at least one of information based on a sensing result obtained by a sensor, information indicating a traveling state of the vehicle, information indicating a state of a driver of the vehicle, positional information of the vehicle, map information around the vehicle, or surrounding environment information acquired from exterior of the vehicle.

9. An information processing method comprising:
acquiring vehicle related information serving as information relating to a vehicle switchable between manual driving and automatic driving and indicating information used for determining whether switching to the automatic driving is possible;
determining whether each of one or more conditions to switch from the manual driving to the automatic driving is satisfied, based on the vehicle related information;
counting a number of one or more unsatisfied conditions; and
outputting information corresponding to the one or more unsatisfied conditions each indicating a condition determined to be unsatisfied at the determining, when the counted number of the one or more unsatisfied conditions is equal to or less than a first threshold.

10. The method to claim 9, wherein the outputting includes outputting information indicating which condition is unsatisfied, as the information corresponding to the one or more unsatisfied conditions.

11. The method according to claim 9, wherein the outputting includes outputting information indicating cause of the one or more unsatisfied conditions, as the information corresponding to the one or more unsatisfied conditions.

12. The method according to claim 9, wherein the outputting includes outputting information for promoting a driver to correct one or more driver correctable conditions included in the one or more unsatisfied conditions, as the information corresponding to the one or more unsatisfied conditions.

13. The apparatus according to claim 12, wherein the outputting includes outputting information corresponding to an unsatisfied condition uncorrectable by the driver's operation, with priority over information corresponding to the driver correctable conditions.

14. The apparatus according to claim 12, wherein the outputting includes outputting the information for promoting the driver to correct the driver correctable conditions, as the information corresponding to the one or more unsatisfied conditions, when a number of unsatisfied conditions is equal to or less than a second threshold and all the unsatisfied conditions are driver correctable conditions.

15. The method according to claim 9, wherein the one or more conditions includes at least one of conditions that a vehicle speed falls within a predetermined range, an inter-vehicular distance is equal to or less than a threshold, the vehicle is traveling in a region corresponding to a central portion of a road, time is in a time period in which automatic driving is possible, weather is weather in which automatic driving is possible, a turn signal is not in operation, a steering angle of a steering wheel falls within a fixed threshold, a surface of a traveling road is not covered with a material other than asphalt, wipers are not in operation, or a traveling position is in a section in which automatic driving is possible in map information.

16. The apparatus according to claim 9, wherein the vehicle related information includes at least one of information based on a sensing result obtained by a sensor, information indicating a traveling state of the vehicle, information indicating a state of a driver of the vehicle, positional information of the vehicle, map information around the vehicle, or surrounding environment information acquired from exterior of the vehicle.

17. A computer program product comprising a non-transitory computer-readable medium including program instructions embodied thereon, wherein the instructions, when executed by a computer, cause the computer to perform:
acquiring vehicle related information serving as information relating to a vehicle switchable between manual driving and automatic driving and indicating information used for determining whether switching to the automatic driving is possible;
determining whether each of one or more conditions to switch from the manual driving to the automatic driving is satisfied, based on the vehicle related information;
counting a number of one or more unsatisfied conditions; and
outputting information corresponding to the one or more unsatisfied conditions each indicating a condition determined to be unsatisfied at the determining, when the counted number of the one or more unsatisfied conditions is equal to or less than a threshold.

18. The apparatus according to claim 1, wherein the one or more unsatisfied conditions comprises a plurality of unsatisfied conditions.

* * * * *